(12) United States Patent
Nurminen et al.

(10) Patent No.: US 9,439,237 B2
(45) Date of Patent: Sep. 6, 2016

(54) METHOD AND APPARATUS FOR STATISTICAL HANDLING OF CONNECTIONS

(75) Inventors: Jukka Nurminen, Espoo (FI); Ismo Puustinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 178 days.

(21) Appl. No.: 13/977,830

(22) PCT Filed: Jan. 7, 2011

(86) PCT No.: PCT/FI2011/000002
§ 371 (c)(1),
(2), (4) Date: Jul. 1, 2013

(87) PCT Pub. No.: WO2012/093193
PCT Pub. Date: Jul. 12, 2012

(65) Prior Publication Data
US 2013/0294350 A1 Nov. 7, 2013

(51) Int. Cl.
| | |
|---|---|
| *H04W 76/06* | (2009.01) |
| *H04L 12/24* | (2006.01) |
| *H04L 12/26* | (2006.01) |
| *H04W 52/02* | (2009.01) |
| *H04W 24/08* | (2009.01) |
| *H04W 76/02* | (2009.01) |

(52) U.S. Cl.
CPC ........ *H04W 76/068* (2013.01); *H04L 41/0663* (2013.01); *H04L 41/0896* (2013.01); *H04L 43/0811* (2013.01); *H04W 52/0238* (2013.01); *H04W 24/08* (2013.01); *H04W 76/027* (2013.01); *H04W 76/064* (2013.01)

(58) Field of Classification Search
CPC . H04L 12/24; H04L 12/26; H04L 29/06326; H04L 29/08576; H04L 29/06537; H04L 29/08369; H04L 41/5025; H04L 12/2637; H04L 47/125; H04W 76/00; G06F 11/22; G06F 11/221; G06F 11/2242; G06F 11/3051
USPC ......... 370/230, 230.1, 242, 248, 252, 395.2, 370/351, 328; 709/226–229, 223–224
See application file for complete search history.

(56) References Cited

U.S. PATENT DOCUMENTS

| | | | |
|---|---|---|---|
| 6,725,378 B1 | 4/2004 | Schuba et al. | |
| 6,788,692 B1* | 9/2004 | Borden | H04L 12/5695 370/228 |
| 7,003,572 B1* | 2/2006 | Lownsbrough | H04L 29/06 709/203 |
| 7,287,082 B1* | 10/2007 | O'Toole, Jr. | H04L 67/1008 709/223 |

(Continued)

FOREIGN PATENT DOCUMENTS

WO    WO0001173 A1    1/2000

OTHER PUBLICATIONS

Ashraf U et al: Route stability in wireless mesh access networks. Dec. 17, 2008.

(Continued)

*Primary Examiner* — Mohamed Kamara
(74) *Attorney, Agent, or Firm* — Seppo Laine Oy

(57) ABSTRACT

In accordance with an example embodiment of the present invention, a method is described which comprises receiving data relating to at least one connection from a network (410), deriving statistical information relating to the at least one connection (420), and causing disconnection of at least one of the at least one connection in dependence of the statistical information (430).

14 Claims, 5 Drawing Sheets

(56) References Cited

U.S. PATENT DOCUMENTS

| | | | | |
|---|---|---|---|---|
| 7,698,434 | B2 * | 4/2010 | June | G06F 9/465 709/223 |
| 8,225,121 | B2 * | 7/2012 | Sotomayor, Jr. | G06F 1/3203 323/234 |
| 8,626,928 | B2 * | 1/2014 | George | H04L 67/14 370/230 |
| 2004/0088413 | A1 * | 5/2004 | Bhogi | G06F 9/5061 709/226 |
| 2006/0280121 | A1 | 12/2006 | Matoba | |
| 2008/0016566 | A1 | 1/2008 | Raz | |
| 2011/0213820 | A1 * | 9/2011 | Morris | H04L 69/16 709/201 |
| 2012/0124217 | A1 * | 5/2012 | Bartley | G06F 1/3209 709/227 |

OTHER PUBLICATIONS

Barbara Stark et al: WANIPConnect 1:2 service for UPnP version 1.0. Sep. 1, 2010.

International Search Report received for corresponding Patent Cooperation Treaty Application No. PCT/FI2011/000002, dated Oct. 7, 2011, 5 pages.

Puustinen, I. et al. "The Effect of Unwanted Internet Traffice on Cellular Phone Energy Consumption", 2011, 4th IFIP International Conference on New Technologies, Mobility and Security (NTMS), Feb. 7, 2011 IEEE, doi:10.1109/NTMS.2011.5720613, pp. 1-5.

* cited by examiner

| Port | Average idle time (ms) |
|---|---|
| 70 | 350 |
| 80 | 42 |
| 82 | 36 000 |

| Port | Highest octets of address | Average idle time (ms) |
|---|---|---|
| 70 | 192.100 | 29 |
| 82 | 91.170 | 137 032 |
| 82 | 91.172 | 430 |

Fig. 3

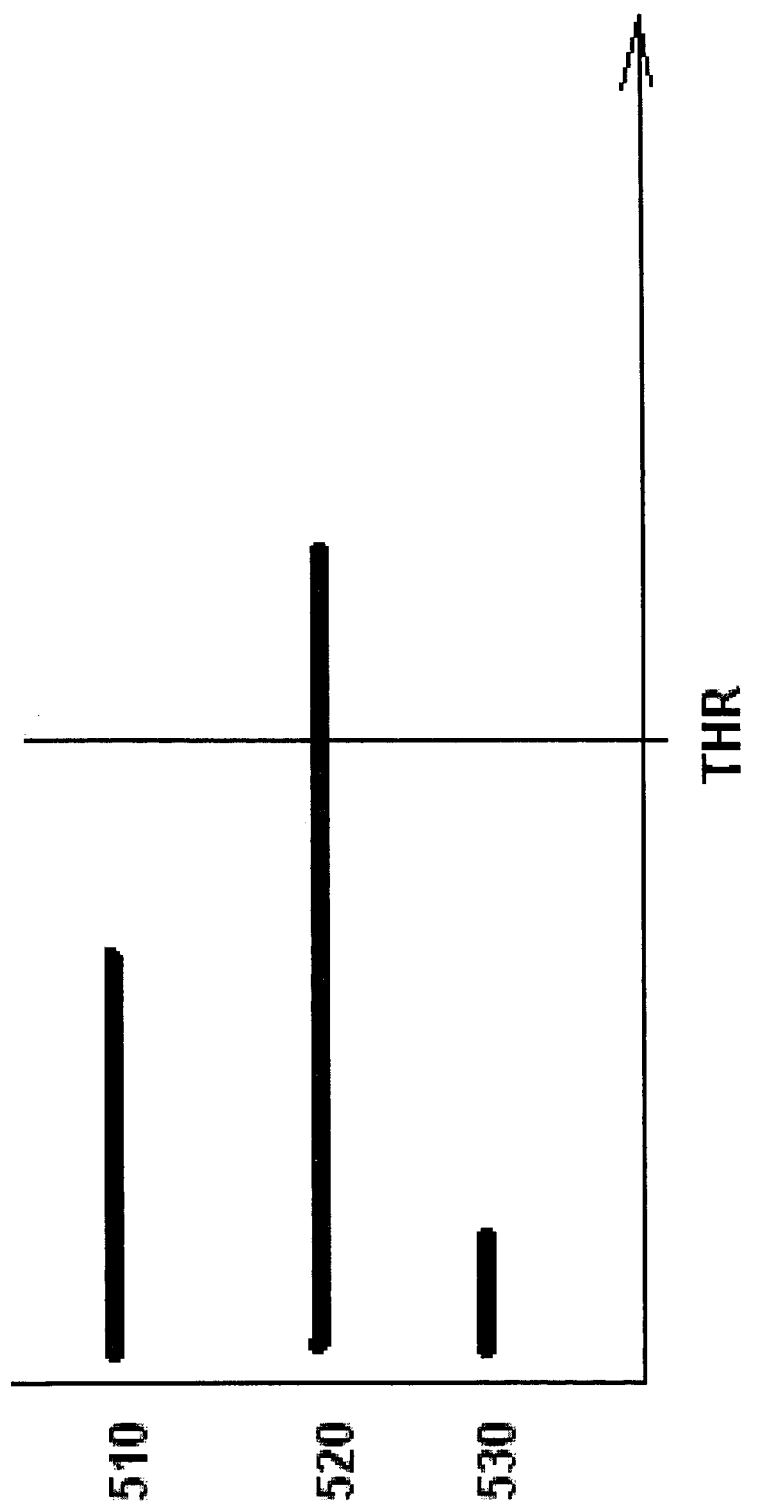

METHOD AND APPARATUS FOR STATISTICAL HANDLING OF CONNECTIONS

RELATED APPLICATION

This application was originally filed as PCT Application No. PCT/FI2011/000002 filed Jan. 7, 2011.

TECHNICAL FIELD

The present application relates generally to management of connections in wireless or wire-line communication networks.

BACKGROUND

In packet-switched networks, devices may form connections to each other by transmitting packets which are received by other connected devices. In accordance with packet-based protocols, once a connection is established between two devices it remains defined until it's disconnected. After establishment and before disconnection packets can be exchanged between the devices, known as endpoints, within the context of the packet-based connection. An example of a packet-based protocol is the transmission control protocol, TCP.

Devices connected to the internet experience frequent unsolicited attempts to form connections. The unsolicited attempts may originate from automatic or malicious programs that seek access to the connected devices and owners of connected devices typically strive to reject or disconnect such attempts.

Connected devices or nodes in a network may be furnished with firewalls configured to filter traffic according to various programmable parameters. Firewalls may be programmed to block unsolicited traffic when characteristics of such traffic are known, and blocking such traffic in the network provides the advantage that the end node doesn't need to receive it.

Where the connected devices are mobile devices, all traffic and connections may be communicated using electromagnetic waves and both reception and transmission consume battery power, which may be a limited resource. Thus in mobile connected devices battery drain is a further reason for owners to try to limit the impact of unsolicited attempts to form connections to their devices. Mobile communication networks define wireless bearer protocols, such as packet data protocol contexts, PDP contexts, to convey packet-based data to and from wireless communication devices.

Some mobile devices are capable of communicating according to more than one wireless protocol, for example via a cellular and a wireless local area network, WLAN, connection. Other examples of wireless protocols include Bluetooth, WiMAX and Wibree protocols which are each adapted for packet-based communication.

SUMMARY

Various aspects of examples of the invention are set out in the claims.

According to a first aspect of the present invention there is provided an apparatus comprising a receiver configured to receive data relating to connections from a network, at least one processing core configured to derive statistical information relating to the connections, the processing core being configured to cause the receiver to disconnect at least one of the connections in dependence of the statistical information.

According to a second aspect of the present invention, there is provided a method is which comprises receiving data relating to at least one connection from a network, deriving statistical information relating to the at least one connection, and causing disconnection of at least one of the at least one connection in dependence of the statistical information.

According to a third aspect of the present invention, there is provided an apparatus, comprising at least one processor, at least one memory including computer program code, the at least one memory and the computer program code configured to, with the at least one processor, cause the apparatus to perform at least receiving data relating to at least one connection from a network, deriving statistical information relating to the at least one connection; and causing disconnection of at least one of the at least one connection in dependence of the statistical information.

According to a fourth aspect, there is provided a computer program configured to cause a method according the second aspect to be performed when the computer program is run on a processor. The computer program may be encoded on a non-transitory computer-readable medium.

BRIEF DESCRIPTION OF THE DRAWINGS

For a more complete understanding of example embodiments of the present invention, reference is now made to the following descriptions taken in connection with the accompanying drawings in which:

FIG. 3 illustrates statistical information according to some embodiments of the present invention.

FIG. 5 illustrates timings related to some embodiments of the present invention.

DETAILED DESCRIPTION OF THE DRAWINGS

An example embodiment of the present invention and its potential advantages are understood by referring to FIGS. 1 through 5 of the drawings.

Figure 1:
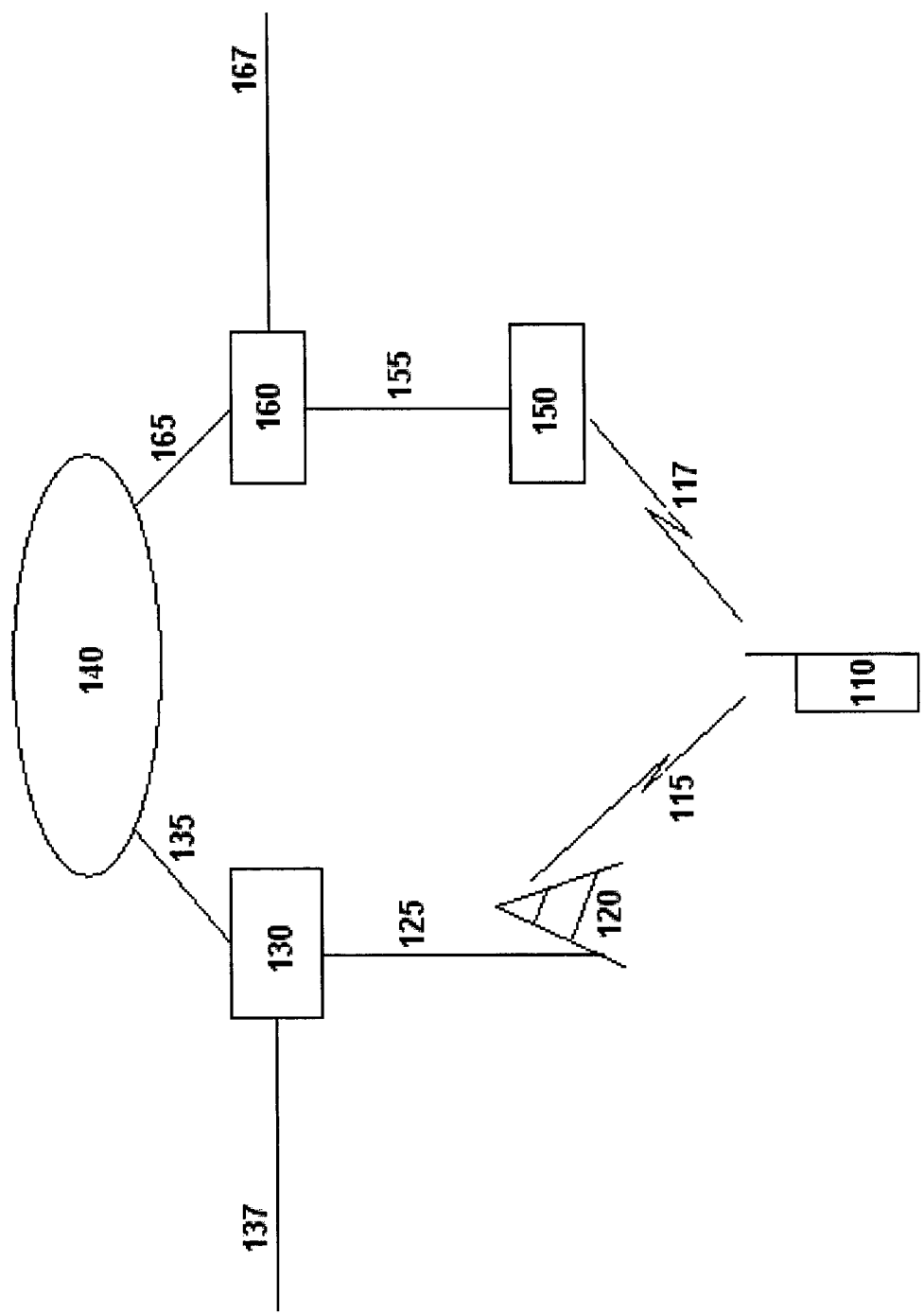
FIG. 1 illustrates an example system where embodiments of the present invention may be employed.

FIG. 1 illustrates an example system where embodiments of the present invention may be employed. Mobile apparatus 110, for example a mobile phone, personal digital assistant, PDA, cellular phone, palmtop computer, laptop or other mobile communications-capable device, is connected to base station 120 by means of wireless link 115. Wireless link 115 may comprise an uplink capable of conveying information from mobile 110 to base station 120 and a downlink capable of conveying information from base station 120 to mobile 110. Wireless link 115 may be in conformance with a cellular technology such as, for example, wideband code division multiple access, WCDMA, global system for mobile communications, GSM or long term evolution, LTE. Mobile 110 may be powered by a battery comprised in mobile 110.

Base station 120 may be capable of communicating in accordance with at least one, and in some embodiments more than one, cellular technology such as, for example, those mentioned above. Base station 120 may be powered from a stable power source and may be furnished with a backup battery. Base station 120 may be connected to a core network mode 130 by means of connection 125. Connection 125 may be a wire-line connection or, for example, a directional microwave link. Core network node 130 may act as a gateway toward further nodes and may be configured to perform functions relating to controlling a cellular communications network. Examples of such functions include routing, authentication, access control and billing subscribers. Examples of core network nodes include switches, management nodes, serving gateways, support nodes and charging systems. Core network node 130 may connect to further core network nodes, which are not illustrated, by means of connection 137. Core network node 130 may connect to the internet 140 by means of connection 135.

In some embodiments core network node 130 may be absent, in which case base station 120 may be connected directly to other base stations and, optionally, the internet 140. In such cases base station 120 may be furnished with at least some of the core network functions mentioned above. In some embodiments nodes not illustrated in FIG. 1 may be present, for example a base station controller node may be disposed between base station 120 and core network node 130.

In some embodiments, in addition to or instead of the cellular chain comprising base station 120 and core network node 130 mobile 110 may communicate by means of a non-cellular chain comprising access point 150 and gateway 160. Mobile 110 may communicate with access point 150 via link 117 which may operate according to WLAN technology or WiMAX technology, for example. Link 117 may, like wireless link 115, comprise an uplink and a downlink. Access point 150 may be connected to gateway 160 by means of connection 155. Connection 155 may be a wire-line connection such as an Ethernet or digital subscriber line, DSL, connection. Gateway 160 may be capable to communicate with internet 140 by means of connection 165 and by further gateways by means of connection 167, which may both be wire-line connections or wireless connections. It is also possible that gateway 160 is absent, and access point 150 is directly connected to internet 140.

When mobile 110 is active and attached to at least one of base station 120 and access point 150, mobile 110 may be visible to nodes comprised in the internet 140. Mobile 110 may receive connection requests from the internet 140 from the cellular chain via core network node 130 and base station 120, or from the non-cellular chain via gateway 160 and access point 150. When mobile 110 is configured to act, for example, as a server it is expected to receive and serve connection requests originating in the internet 140 or, for example, other areas of the cellular network via connection 137 or the non-cellular network via connection 167. Mobile 110 may also receive unsolicited connection requests, such as malware requests.

Upon receiving an unwanted connection request, mobile 110 must transition to an active state from a sleep or power-saving mode to receive the connection request. Base station 120 or access point 150 may page mobile 110 that an incoming connection request has been buffered. Responsive to the page, mobile 110 may transition to an active state and receive the connection request via a downlink. When the connection request isn't followed up with further messages, mobile 110 may remain in an active state until it autonomously transitions back to a sleep or power-save mode. Cellular or non-cellular networks may define a timer that controls how long mobile 110 will remain in an active state waiting for further messages relating to the same connection as the connection request. In WCDMA cellular networks, for example, timers T1 and T2 define the length of time before a connection between mobile 110 and base station 120 is torn down in absence of traffic. When mobile 110 is in an active state, it consumes its battery at a faster rate between reception of the connection request and expiry of the timer. Thus spurious connection requests cause mobile 110 to consume its battery uselessly while it waits for further messages relating to the same connections as the spurious connection requests, before the timer or timers expire.

Since spurious connection requests drain battery in mobile 110, firewalls may be defined to block them. A firewall in, for example, core network node 130 may be configured with known or assumed characteristics of spurious connection requests. Responsive to detecting a message matching the characteristics the firewall may discard the message without forwarding it. Firewalls may be configured to allow only messages that originate from a set of pre-defined addresses. Firewalls also may be configured to only allow traffic originating from Internet 140 from addresses mobile 110 has recently contacted. The firewall may be programmable by mobile 110, which comprises that mobile 110 at least partly defines the characteristics of messages the firewall is to block. In addition to core network node 130, a firewall may also be defined in at least one of mobile 110, base station 120, access point 150 and gateway 160. Firewalls represent a tradeoff since depending on how the characteristics are defined, they filter out spurious traffic but may also filter out at least some non-spurious traffic. Where mobile 110 is configured to act as a server, a firewall operated by an operator of a cellular network in core network node 130, for example, may not provide optimal filtering. In order to not block any non-spurious traffic that mobile 110 wants to serve, the owner of mobile 110 may prefer to not allow a cellular operator to operate or control a firewall with respect to traffic incoming to mobile 110.

When no firewall is configured to filter traffic incoming to mobile 110, spurious as well as non-spurious connection requests are received in mobile 110. The mobile can serve non-spurious, or legitimate, requests normally. Spurious connection requests cause battery drain in mobile 110 as described above. Cellular and non-cellular technologies may be furnished with procedures to disconnect active connections from mobile 110. Such procedures may be invoked by mobile 110 during the timeout period following a connection request before expiry of a timer. Using such a procedure can result in faster teardown of spurious connections and a saving of battery power when compared to passively waiting for a timer to expire to relinquish a connection. Therefore in some cases, actively invoking a teardown procedure can achieve part of the function of a firewall, namely to limit the effects of unwanted, spurious traffic.

To minimize battery drain due to spurious connection requests, mobile 110 may invoke a teardown procedure, for example a fast dormancy procedure in long term evolution, LTE, networks or a disconnect procedure in a WLAN access, promptly responsive to receiving a spurious connection request. Mobile 110 may therefore decide whether a connection request is to be treated as spurious responsive to receiving the connection request. Without a teardown procedure, a connection may remain up until at least one timer expires. Some networks and non-cellular accesses are configured to define timers to keep open connections that experience traffic on a continual basis, so-that the connections don't need to be separately re-established for each packet relating to the connection. Re-establishing a connection may entail, depending on the network, signaling and delay overhead.

Since mobile 110 may not know whether a connection request is spurious or not, to determine whether to treat a connection request as spurious, mobile 110 may be configured to compile statistical information relating to connection requests it receives. Mobile 110 may then invoke a teardown procedure based on the statistical information, to yield a net battery gain when the statistical information is correct and the teardown is on average used for spurious, as opposed to non-spurious, connections. In terms of a single connection, a net battery gain can be considered to have been achieved when a connection is torn down when a subsequent packet relating to the connection arrives later than the disconnect timer value set by the network or non-cellular access. In this case without the teardown procedure, the connection would have remained active during the entire disconnect timer interval without experiencing any incoming traffic.

The statistical information may be derived in terms of a parameter or parameters of the incoming connection requests. Examples of parameters include port numbers to which the connection requests arrive and source addresses included in the connection requests. Another possible parameter is a part of a source address obtained by applying a mask to the source address. Deriving the information comprises that mobile 110 monitors a connection initiated by an incoming connection request for subsequent traffic. When the next message arrives relating to the connection, mobile 110 records the time that elapsed between the connection request and the next message. The statistical information may comprise an average value of elapsed times in terms of the at least one parameter, for example the statistical information may comprise an average idle time following a connection request for each port in mobile 110 that receives connection requests. The statistical information may also comprise separately an average idle time for each combination of port and source address. Mobile 110 may be configured to collect a set number of connections before defining an average, for example 20, 40 or 80 connections. Using a mask to obtain a part of the source address allows mobile 110 to derive statistical information for traffic originating from a certain higher-level domain such as a country.

Average values comprised in the statistical information may be defined as running averages, for example running averages of the past 20, 40 or 80 connections pertaining to the parameter or combination of parameters. This allows mobile 110 to learn malware patterns, for example where malware that is active toward mobile 110 transmits spurious connection requests to a first port of mobile 110, the statistical information will after a certain time indicate that connection requests received at the first port are not followed up by subsequent traffic. In this case, the average idle time associated with the first port is long and mobile 110 will conserve battery by invoking a teardown procedure responsive to receiving a connection request at the first port. The same applies if connection requests arriving to the first port from a certain address have a long average idle time, while connection request arriving to the first port from other addresses may be legitimate traffic. In this case, mobile 110 may be configured to invoke a teardown process responsive to receiving a connection request to the first port from the certain address. That the averages can, in some embodiments, be made running averages allows mobile 110 to adapt to malware patterns that change as a function of time. It's possible, for example, that a new malware program becomes active or that an active one becomes inactive.

In order to detect that an average idle time associated with a certain parameter or combination of parameters decreases, mobile 110 may be configured to forego invoking a teardown procedure for a minority of incoming connection requests, for example for every tenth or twentieth. This way mobile 110 will be able to measure the elapsed time from connection request to a subsequent message without interrupting the period with a teardown procedure. Alternatively mobile 110 may be configured to invoke the teardown procedure for all incoming connection requests for which the statistical information indicates the expected idle time would be long, but retain the capability to associate subsequent traffic with the connection requests in order to maintain a running average of the idle time. This can be achieved, for example, by storing in memory characteristics of the connection request prior to invoking the teardown process. Deciding whether to invoke the teardown process can be based on comparing an expected idle time comprised in the statistical information to a threshold idle time. Responsive to the expected idle time exceeding the threshold idle time, teardown can be invoked. The threshold idle time may correspond, for example, the timeout timer value defined by the cellular or non-cellular network, or that timer value multiplied by two, for example.

Figure 2:
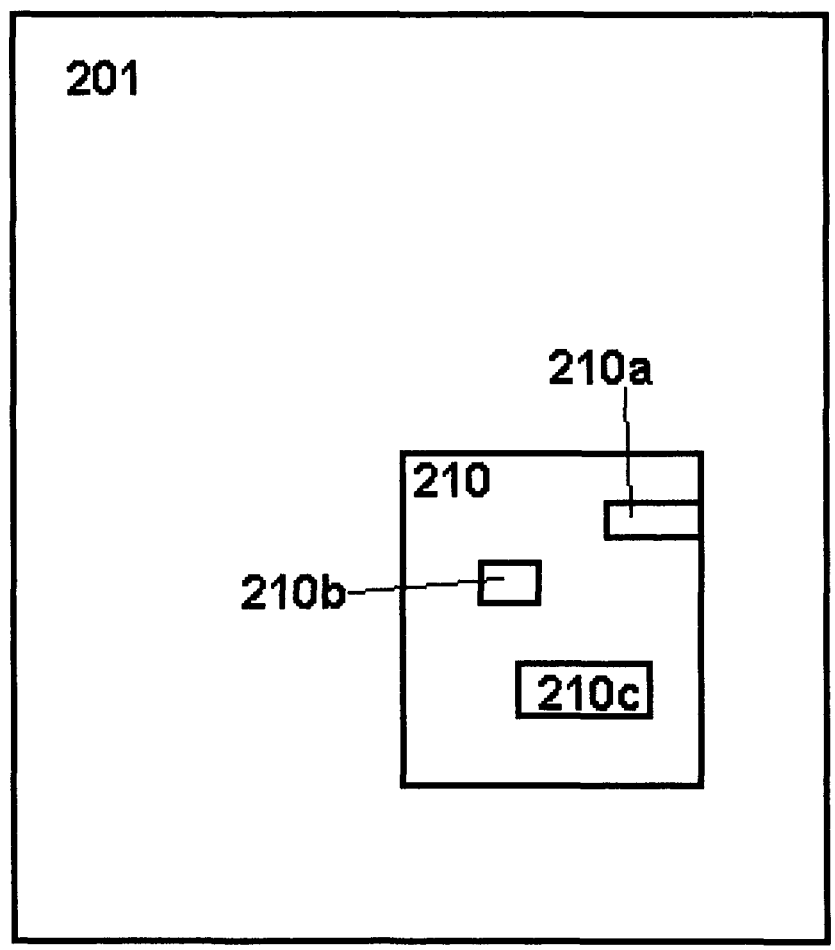
FIG. 2 illustrates an example apparatus 201 capable of supporting embodiments of the present invention.

FIG. 2 illustrates an example apparatus 201 capable of supporting embodiments of the present invention. The apparatus may correspond to apparatus 110, base station 120 or a node in core network 130 of FIG. 1, for example. The apparatus is a physically tangible object, for example a mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example statistical information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise a processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

FIG. 3 illustrates statistical information according to some embodiments of the present invention. In the upper section of FIG. 3 is illustrated statistical information according to some embodiments of the invention. Mobile 110 is in these embodiments configured to derive statistical information comprising average idle times per port. In the illustrated example, connection requests arriving at port 82 have a long idle time and are candidates for invoking a teardown procedure for quick termination of the connection. Requests arriving at ports 70 and 80 have average idle times of less than a second and probably represent for the most part legitimate traffic. The threshold idle time is not illustrated in FIG. 3 and decisions whether to invoke teardown may depend on it in addition to the statistical information illustrated.

The lower part of FIG. 3 illustrates statistical information according to further embodiments of the invention. Mobile 110 is in these embodiments configured to derive statistical information comprising average idle times per port and highest two octets of connection request source address. In the illustrated example requests arriving at port 82 from the subnet defined by highest two octets 91.170 have a long average idle time and are candidates for termination by invoking a teardown procedure. Connection requests arriving at port 70 from the subnet defined by highest two octets 192.100 have a low average idle time, as do those arriving at port 82 from the subnet defined by highest two octets 91.172. In this case, mobile 110 is able to differentiate between traffic arriving at port 82 from different addresses, which provides for more selectivity in invoking a teardown procedure for the corresponding connections.

In some embodiments mobile 110 may be configured to increase the level of selectivity responsive to determining that connection requests associated with a parameter have a high average idle time. For example in the upper part of FIG. 3 mobile 110 may determine that connection requests arriving at port 82 are associated with a high average idle time. Mobile 110 may responsively compile separate statistical information on port 82 based on source address or part thereof, such as in the lower part of FIG. 3. This way the teardown procedure is applied more selectively.

It should be recognized that IPv4 is used in FIG. 3 only as an example and the invention is by no means limited thereto, for example IPv6 or another addressing scheme being equally suitable in embodiments that use addresses or parts thereof as parameters. It should also be recognized that an average idle time isn't always an actual idle time for each arriving connection request. For example, both malware-originated, or spurious, and legitimate, or non-spurious, traffic may arrive at the same port. It may occasionally occur that a legitimate connection is torn down based on the statistical information. In this case the connection is re-established as subsequent packets arrive pertaining to the non-spurious connection. Re-establishing the connection may cause some signaling that wouldn't be necessary if the connection hadn't been torn down. Re-establishing the connection may also cause some delay. While such signaling is associated with a drain on battery resources of mobile 110, a net gain in battery use is nonetheless achieved as long as the teardown procedure is usually invoked correctly based on the statistical information. In other words a benefit is achieved when the battery gain from correctly terminated spurious connections outweighs the battery drain from restoring incorrectly terminated non-spurious connections.

Figure 4:
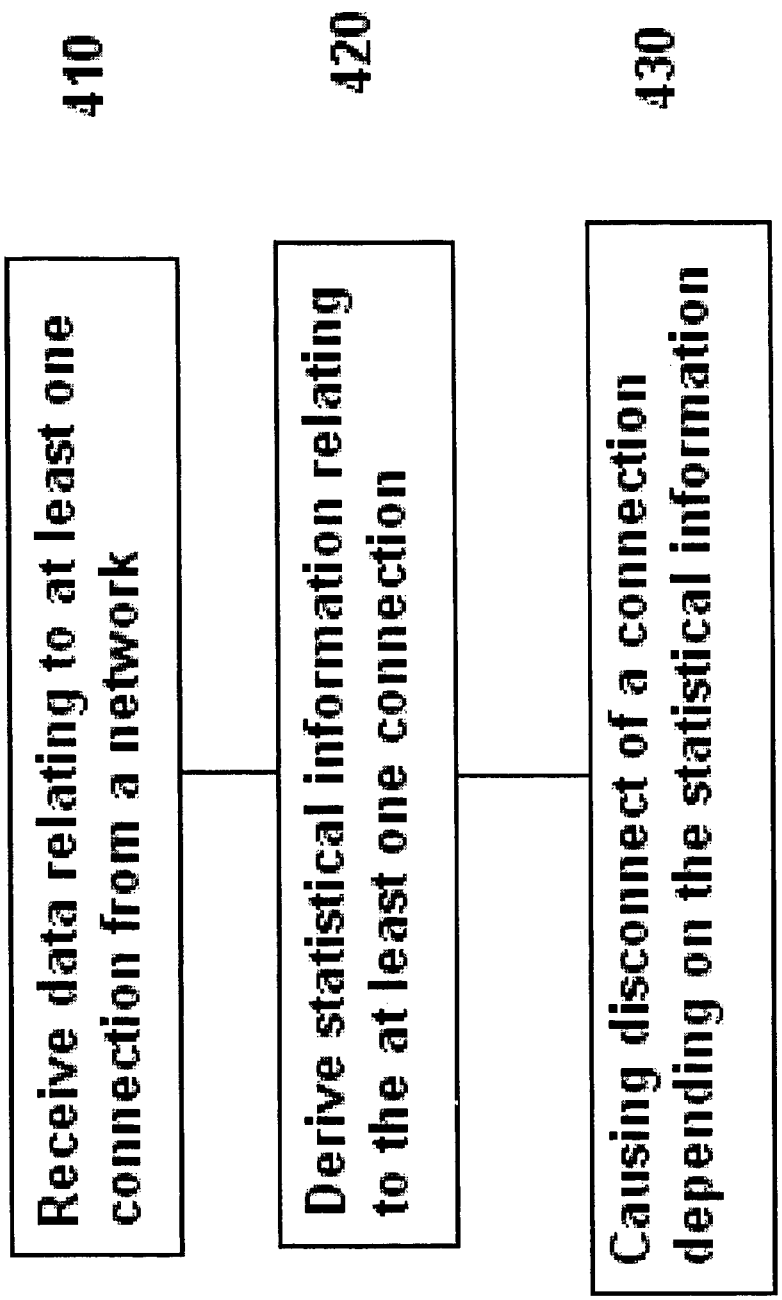
FIG. 4 is a flowgraph of a process according to an example embodiment of the present invention.

FIG. 4 is a flowgraph of a process according to an example embodiment of the present invention. In phase 410, an apparatus, for example mobile 110 or an apparatus comprised in mobile 110, receives data relating to at least one connection from a network. The information may be comprised, for example, in connection requests and the information may comprise parameters, such as destination port and source address.

In phase 420 of the process, statistical information is derived which relates to at least one connection. The statistical information may correspond, for example, to information illustrated in FIG. 3 and discussed above. The statistical information may be derived in terms of at least one parameter. The statistical information may be stored in a memory comprised in mobile 110.

In phase 430 of the process, a connection is disconnected, or caused to be disconnected, in dependence of the statistical information and information relating to the connection. For example, if the statistical information indicates that connections relating to connection requests with parameters that match those of the connection request relating to the connection to be disconnected have an average idle time exceeding a threshold idle time, the connection may be disconnected. The statistical information may comprise average idle times that are running, or moving, averages.

In one embodiment, a node comprised in a network is configured to perform phases 410, 420 and 430. The node may be a base station, base station controller, radio network controller, support node, switching centre, mobility management entity or serving gateway, for example. The network node may be in the path of the connection to be disconnected or the network node may in other ways participate in establishing and/or maintaining the connection. In this embodiment, disconnecting in phase 430 may comprise transmitting to mobile 110 a shortened timeout value relating to the connection or transmitting to mobile 110 a message comprising a disconnection instruction. Disconnecting in phase 430 may alternatively comprise causing another network node to transmit a shortened timeout value relating to the connection, or a message comprising a disconnection indication, to mobile 110.

FIG. 5 illustrates timings related to some embodiments of the present invention. In the figure time is on the horizontal axis and increases from left to right. A threshold idle time is illustrated as a vertical line, which is labeled THR. Labels 510, 520 and 530 correspond to parameter values, or combinations of parameter values such as, for example, port numbers or combinations of port numbers and source addresses. In the illustrated example, labels 510 and 530 correspond to parameters of connection requests that relate to connections with average idle times less than the threshold idle time and 520 corresponds to parameters of connection requests that relate to connections with average idle times exceeding the threshold idle time. The threshold idle time may correspond to a timeout value set by a cellular or non-cellular network. The timeout value may be a time that a mobile attached to the cellular or non-cellular network keeps open a connection with no traffic before disconnecting it. An example of a timeout value is the timers T1 and T2 of WCDMA networks.

Without in any way limiting the scope, interpretation, or application of the claims appearing below, a technical effect of one or more of the example embodiments disclosed herein is that battery resources can be conserved by proactively disconnecting malware-related connections to mobile devices, such as for example mobile servers. Another technical effect of one or more of the example embodiments disclosed herein is that selectivity of proactive disconnection can be increased to improve the accuracy of discrimination between spurious and non-spurious connection requests. Another technical effect of one or more of the example embodiments disclosed herein is that the use of operator-controlled firewalls can be avoided for users that offer mobile server applications.

Embodiments of the present invention may be implemented in software, hardware, application logic or a combination of software, hardware and application logic. The software, application logic and/or hardware may reside on memory 210*b*, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a receiver configured to receive data relating to connections from a network;
at least one processing core configured to derive statistical information relating to the connections;
the at least one processing core being configured to cause disconnection of at least one first connection in dependence of the statistical information, and
wherein the statistical information comprises at least one average idle time, wherein the at least one processing core is configured to cause disconnection of the at least one first connection responsive to an average idle time exceeding a predefined threshold idle time, the average idle time being obtained from averaging idle times of a plurality of second connections, distinct from the first connection, the second connections having a parameter that matches a corresponding parameter of the first connection.

2. The apparatus according to claim 1, wherein the statistical information comprises information concerning the connections in terms of at least one parameter.

3. The apparatus according to claim 2, wherein the at least one parameter comprises at least one of port number, source address and a part of a source address obtained by applying a mask to the source address.

4. The apparatus according to claim 1, wherein the apparatus is configured to cause disconnection of the at least one first connection before the at least one first connection has been idle for the predefined threshold idle time.

5. The apparatus according to claim 1, wherein the predefined threshold idle time corresponds to a connection timeout period defined by the network.

6. The apparatus according to claim 1, wherein the apparatus comprises a mobile communication device, the apparatus further comprising an antenna coupled to the receiver and configured to provide signals to the at least one processing core.

7. The apparatus according to claim 1, wherein the apparatus is comprised in a network node and causing disconnection comprises transmitting at least one of a shortened timer value and a disconnect message to a mobile.

8. A method, comprising:
receiving data relating to at least one connection from a network;
deriving statistical information relating to the at least one connection;
causing disconnection of at least one first connection in dependence of the statistical information, and
wherein the statistical information comprises at least one average idle time, wherein the at least one first connection is caused to be disconnected responsive to an average idle time exceeding a predefined threshold idle time, the average idle time being obtained from averaging idle times of a plurality of second connections, distinct from the first connection, the second connections having a parameter that matches a corresponding parameter of the first connection.

9. The method according to claim 8, wherein the statistical information comprises information concerning the connections in terms of at least one parameter.

10. The method according to claim 8, wherein the at least one parameter comprises at least one of port number, source address and a part of a source address obtained by applying a mask to the source address.

11. The method according to claim 8, wherein the at least one first connection is caused to be disconnected before the at least one first connection has been idle for the predefined threshold idle time.

12. The method according to claim 8, wherein the predefined threshold idle time is a connection timeout period defined by the network.

13. The method according to claim 8, wherein causing disconnection comprises transmitting at least one of a shortened timer value and a disconnect message to a mobile.

14. A computer program product comprising a non-transitory computer-readable medium bearing computer program code embodied therein for use with a computer, the computer program code comprising:
code for receiving data relating to at least one connection from a network;
code for deriving statistical information relating to the at least one connection;
code for causing disconnection of at least one first connection in dependence of the statistical information, and
wherein the statistical information comprises at least one average idle time, wherein the at least one first connection is caused to be disconnected responsive to an average idle time exceeding a predefined threshold idle time, the average idle time being obtained from averaging idle times of a plurality of second connections, distinct from the first connection, the second connections having a parameter that matches a corresponding parameter of the first connection.

\* \* \* \* \*